Patented Jan. 23, 1934

1,944,306

UNITED STATES PATENT OFFICE 1,944,306

PROCESS FOR PRODUCING 1.1.2 TRI-
CHLORO-ETHANE

Julius Söli, Frankfort - on - the - Main-Schwan -
heim, Germany, assignor to I. G. Farbenin-
dustrie Aktiengesellschaft, Frankfort-on-the-
Main, Germany No Drawing. Application January 30, 1930,
Serial No. 424,736, and in Germany March 11,
1929

17 Claims. (Cl. 260—166)

This invention relates to the production of 1.1.2-trichloro-ethane.

The production of 1.1.2-trichloro-ethane was hitherto generally carried out by subjecting vinyl-chloride to chlorination according to the equation:

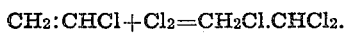
$$CH_2:CHCl + Cl_2 = CH_2Cl.CHCl_2.$$

For preparing the vinyl-chloride, acetylene was reacted upon with hydrochloric acid. However, the vinyl-chloride thus obtained is contaminated by unreacted acetylene, hydrochloric acid and indifferent gases, owing to incompleteness of the reaction, as the velocity of the reaction between hydrochloric acid and acetylene is strongly reduced when the reaction gases become diluted with vinyl-chloride. For this reason it was hitherto considered necessary to remove the vinyl-chloride by low cooling or in any other suitable manner before subjecting it to further chlorination.

Acetylene being a very reactive substance in comparison with vinyl-chloride, it was to be supposed that the chlorination of a mixture of acetylene and vinyl-chloride would primarily result in the chlorination of the acetylene, leaving the vinyl-chloride unreacted. Contrary to this supposition I have now found that it is possible, by the application of certain conditions of working, to effect chlorination of a mixture of acetylene with vinyl-chloride in such a manner as to preferably or even exclusively chlorinate the vinyl-chloride.

This discovery has resulted in the development of a process which results in the direct production of trichloro-ethane from acetylene.

A preferable mode of carrying out my present invention consists in first passing acetylene and hydrochloric acid gas through a suitable reaction device, in which both substances are combined so as, at least partly, to form vinyl-chloride. The current of gas issuing from the reaction chamber, which may still contain certain amounts of hydrochloric acid and indifferent foreign gases, is then led into the chlorinating device. In this device the gases are mixed with chlorine preferably in an amount not exceeding the quantity of the vinyl-chloride present. Under these circumstances, trichloro-ethane is practically exclusively formed. The process, as described, however may be varied by applying a small excess of chlorine, especially when the gas supplied still contains hydrochloric acid. The chlorination products of acetylene resulting in this case under certain conditions of working are subsequently separated from the trichloro-ethane by fractioned distillation.

The gases issuing from the chlorinating apparatus are then conducted into a device for condensing such amounts of trichloro-ethane as not have already separated in the chlorinating apparatus. The residual gases may then also be converted into trichloro-ethane in a separate apparatus, or they may be employed in any other manner. Preferably, however, these gases are re-introduced in a circular current into the apparatus for producing vinyl-chloride. Before entering the latter, a predetermined quantity of acetylene and, if required, also a quantity of hydrochloric acid gas is admixed to the circular current. Further a predetermined quantity of chlorine is added to the gases before entering the chlorinating apparatus. In case of emergency, a certain unregulated quantity of the circulating gases is, by means of a water seal, discharged at a suitable point of the circuit. By suitably regulating the respective quantities of acetylene, hydrochloric acid gas, and chlorine, supplied from without, a predetermined composition of the circulating gases may be maintained. Thus, for example the acetylene contents may be kept raised by supplying a comparatively large percentage of acetylene, this resulting in a high velocity of reaction. A similar effect is obtained when maintaining a high percentage of hydrochloric acid gas by a correspondingly large supply of the latter. This results in a circulating gas which is but little liable to ignition and explosion, and offers the further advantage that the formation of trichloro-ethane also occurs in the chlorinating apparatus by direct combination of acetylene, chlorine and hydrochloric acid. Furthermore it is equally possible to accumulate the foreign inert gases (nitrogen, carbonic acid etc.) in the circulating current. In this case the gases escaping through the water seal contain a particularly small quantity of acetylene, so that it is in certain cases even possible to refrain from recovering these amounts. Moreover, the reaction in the apparatus is moderated by the presence of inert gases, this being particularly desirable with respect to the chlorinating apparatus.

The present invention is preferably carried out in the manner described in German Patents 278,249 and 288,584. Besides the catalysts called for in those patents, namely salts of mercury, it is also possible to employ activated carbon or silica-gel with or without addition of metal salts as for instance mercury chloride. Furthermore it is possible to employ either aqueous hydrochloric acid or hydrochloric acid gas. The chlorination of the vinyl-chloride may be carried out according to the processes described in U. S. Patents 1,833,358 and 1,833,393, dated November 24, 1931, to Otto Ernst and Heinrich Lange, which processes substantially consist in performing the reaction by the aid of actinic rays or heat in absence of a solvent. Moreover, the present process may be advantageously modified by carrying out the chlorination in the presence of the trichloro-ethane condensed during the process as indicated above, (or in presence of another solvent) which is in contact with a catalyst, and moreover by exposing the reaction mixture to actinic rays.

Iron borings have yielded particularly good results when employed as a catalyst. Preferably, a tower is employed as a reaction chamber, in which the iron borings are moistened or irrigated with trichloro-ethane while the gases are passed through the tower. Instead of a tower it is also possible to employ a stirring vessel containing a mixture of trichloro-ethane with iron borings or pulverized iron.

The process hereinbefore described results in the production, in a single direct process of practically pure trichloro-ethane with a yield closely approximating the quantitative.

I claim:

1. A process for producing 1.1.2-trichloroethane which comprises first causing acetylene to react with hydrochloric acid and then causing the resulting gaseous mixture containing vinyl-chloride to react with chlorine.

2. A process for producing 1.1.2-trichloroethane, which comprises first causing acetylene to react with hydrochloric acid and then causing the resulting gaseous mixture containing vinyl-chloride to react with chlorine, separating the trichloro-ethane formed, then adding fresh amounts of acetylene and hydrochloric acid, to at least part of the residual gases and reintroducing the gaseous mixture thus obtained into the process.

3. A process for producing 1.1.2-trichloroethane, which comprises first causing acetylene to react with hydrochloric acid and then causing the resulting gaseous mixture containing vinyl-chloride to react with chlorine, separating the trichloro-ethane formed, discharging a part of the residual gases, then adding fresh amounts of acetylene and hydrochloric acid, to the residual gases and reintroducing the gaseous mixture thus obtained into the process.

4. A process for producing 1.1.2-trichloroethane which comprises first causing acetylene to react with hydrochloric acid and then causing the resulting gaseous mixture containing vinyl-chloride to react with chlorine in a quantity not exceeding the equivalent of the vinyl-chloride present.

5. A process for producing 1.1.2-trichloroethane which comprises first causing acetylene to react with hydrochloric acid and then causing the resulting gaseous mixture containing vinyl-chloride to react with chlorine in the presence of a surface catalyst, said catalyst being in contact with liquid trichloroethane.

6. A process for producing 1.1.2-trichloroethane which comprises first causing acetylene to react with hydrochloric acid and then causing the resulting gaseous mixture containing vinyl-chloride to react with chlorine in a quantity not exceeding the equivalent of the vinyl-chloride present and in the presence of a surface catalyst, said catalyst being in contact with liquid trichloroethane.

7. A process for producing 1.1.2-trichloroethane which comprises first causing acetylene to react with hydrochloric acid and then causing the resulting gaseous mixture containing vinyl-chloride to react with chlorine in the presence of iron borings as a catalyst, said catalyst being in contact with liquid trichloroethane.

8. A process for producing 1.1.2-trichloroethane which comprises first causing acetylene to react with hydrochloric acid and then causing the resulting gaseous mixture containing vinyl-chloride to react with chlorine in a quantity not exceeding the equivalent of the vinyl-chloride present and in the preesnce of iron borings as a catalyst, said catalyst being in contact with liquid trichloroethane.

9. A process for producing 1.1.2-trichloroethane which comprises first causing acetylene to react with hydrochloric acid and then causing the resulting gaseous mixture containing vinyl-chloride to react with chlorine in a quantity not exceeding the equivalent of the vinyl-chloride present, separating the trichloroethane formed, discharging a part of the residual gases, then adding fresh amounts of acetylene and hydrochloric acid to the residual gases and reintroducing the gaseous mixture thus obtained into the process.

10. A process for producing 1.1.2-trichloroethane which comprises first causing acetylene to react with hydrochloric acid and then causing the resulting gaseous mixture containing vinyl-chloride by the aid of actinic rays to react with chlorine in the presence of a surface catalyst, said catalyst being in contact with liquid trichloroethane.

11. A process for producing 1.1.2-trichloroethane which comprises first causing acetylene to react with hydrochloric acid and then causing the resulting gaseous mixture containing vinyl-chloride by the aid of actinic rays to react with chlorine in a quantity not exceeding the equivalent of the vinyl-chloride present and in the presence of a surface catalyst, said catalyst being in contact with liquid trichloroethane.

12. A process for producing 1.1.2-trichloroethane which comprises first causing acetylene to react with hydrochloric acid and then causing the resulting gaseous mixture containing vinyl-chloride by the aid of actinic rays to react with chlorine in the presence of iron borings as a catalyst, said catalyst being in contact with liquid trichloroethane.

13. A process for producing 1.1.2-trichloroethane which comprises first causing acetylene to react with hydrochloric acid and then causing the resulting gaseous mixture containing vinyl-chloride by the aid of actinic rays to react with chlorine in a quantity not exceeding the equivalent of the vinyl-chloride present and in the presence of iron borings as a catalyst, said catalyst being in contact with liquid trichloroethane.

14. Process for producing 1.1.2-trichloroethane by leading vinyl chloride and chlorine in the presence of a chlorine carrier into a solvent for the reactants and the reaction product.

15. Process for producing 1.1.2-trichloroethane by leading vinyl chloride and chlorine in the presence of a chlorine carrier into 1.1.2-trichloroethane.

16. Process for producing 1.1.2-trichloroethane which comprises first causing acetylene to react with hydrochloric acid and then causing the resulting gaseous mixture containing vinyl chloride to react with chlorine in the presence of a surface catalyst impregnated with a metal salt, chlorination catalyst, said catalyst being in contact with liquid trichloroethane.

17. Process for producing 1.1.2-trichloroethane which comprises first causing acetylene to react with hydrochloric acid and then causing the resulting gaseous mixture containing vinyl chloride to react with chlorine in a quantity not exceeding the equivalent of the vinyl chloride present and in the presence of a surface catalyst impregnated with a metal salt chlorination catalyst, said catalyst being in contact with liquid trichloroethane.

JULIUS SÖLL.